United States Patent

[11] 3,570,686

[72] Inventor Robert Moll
    9 bis Vidollet, Geneva, Switzerland
[21] Appl. No. 807,504
[22] Filed Mar. 17, 1969
[45] Patented Mar. 16, 1971
[32] Priority Mar. 21, 1968
[33] Switzerland
[31] 4414/68

[54] APPARATUS FOR ARRANGING PUBLICATIONS IN GROUPS
    2 Claims, 2 Drawing Figs.
[52] U.S. Cl. ................................................ 214/7, 198/76
[51] Int. Cl. .................................................. B65g 57/08
[50] Field of Search ....................................... 214/7; 198/33, 35, 76

[56] References Cited
    UNITED STATES PATENTS
    1,263,515  4/1918  Biehler et al. .............. 198/35X
    1,501,285  7/1924  Lawrence .................. (198/35UX)
    2,596,228  5/1952  Fletcher .................... (214/7UX)

Primary Examiner—Robert G. Sheridan
Attorney—Cameron, Kerkam and Sutton

ABSTRACT: Publications are spaced on a continuous horizontal belt conveyor and are lifted from the belt conveyor and turned at right angles into a chute where the publications are grouped. A rotary element having radially and angularly spaced fingers moves the publications from the horizontal conveyor to the chute. The speed of rotation of the rotary element is regularly increased and decreased to allow more time for the publications to enter the spaces between the fingers without increasing the total time of the operational cycle.

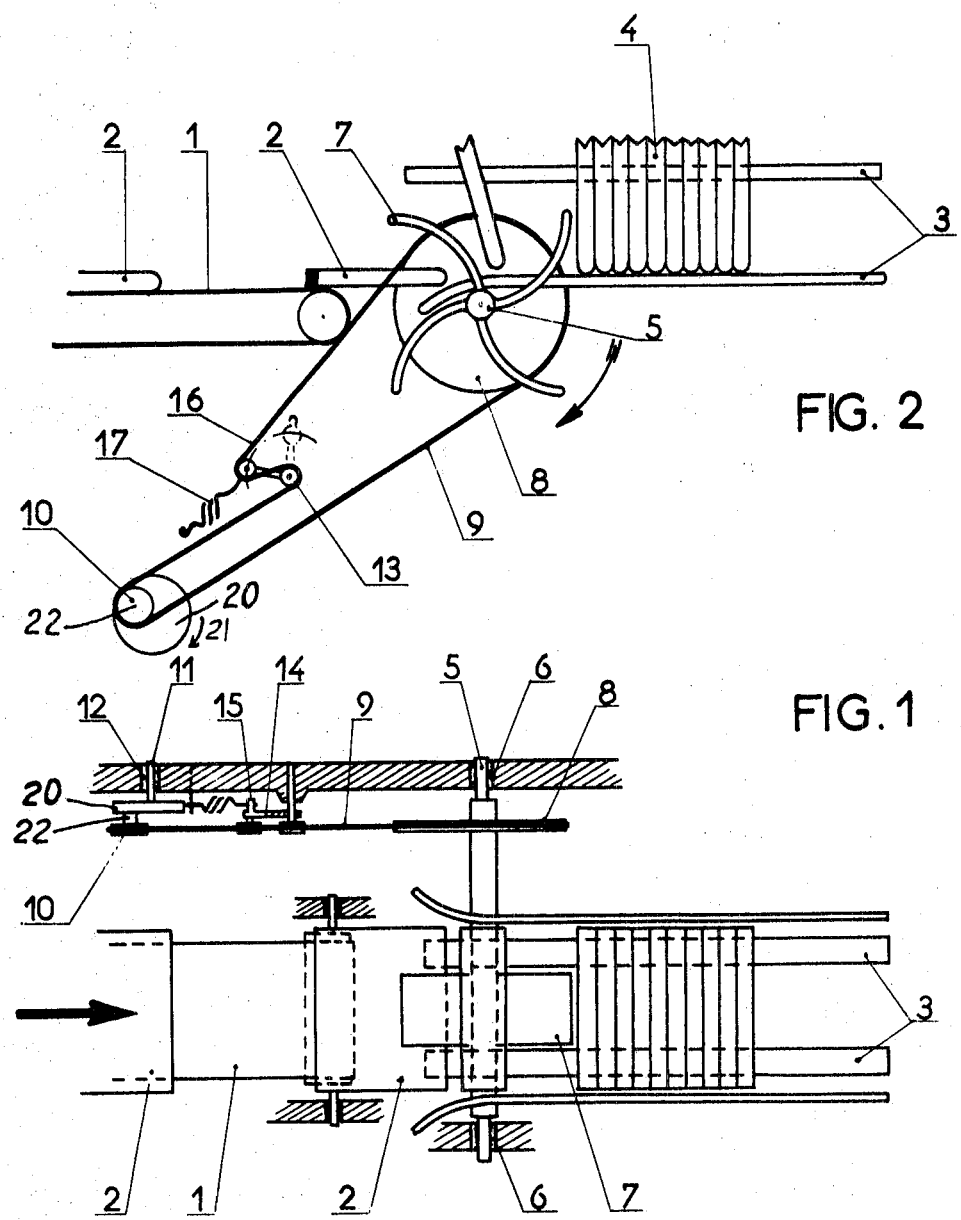

APPARATUS FOR ARRANGING PUBLICATIONS IN GROUPS

BACKGROUND OF THE INVENTION

The present invention provides improvements in known apparatus for grouping publications including a rotary transfer member having a shaft on which radial elements of equidistant angularity are mounted. The publications are moved at regular intervals into the space between two radial elements to transfer the publication through 90° into a chute grouping and guiding the grouped publications.

DESCRIPTION OF THE PRIOR ART

Devices are known including a transfer member having radial arms mounted on a rotary axis with the publication being introduced from a horizontal conveyor into the space between two arms during rotation of the transfer member. The publication is moved by the transfer member into a chute grouping and guiding the grouped publications.

In known devices, the amount of time available for introduction of the publication into the space between pairs of arms of the transfer device is very limited if the device is to be operated at efficient speed.

SUMMARY OF THE INVENTION

The present invention increases the length of time available for introduction of the publication into the space between pairs of arms of the transfer member without increasing the time cycle of the apparatus by uniformly accelerating and decelerating the rotary transfer member in such a way as to increase the time available for introduction of the publication into the rotary transfer member without increasing the time of the operating cycle. To this end, the rotary transfer member is driven through a flexible nonextensible driving member such as a chain or belt which, in turn is driven by an eccentrically mounted pulley or gear. A takeup device is provided to maintain the chain or bet belt under uniform tension regardless of the position of the eccentrically mounted pulley or gear.

BRIEF DESCRIPTION OF THE DRAWINGS

A preferred embodiment of the present invention is shown in the accompanying drawings in which FIG. 1 is a plan view of such an embodiment; and FIG. 2 is a longitudinal view of the embodiment of FIG. 1.

DESCRIPTION OF THE PREFERRED EMBODIMENT

The apparatus of the present invention includes a continuous conveyor belt 1 supporting publications 2 at predetermined intervals, for grouping in chute 3. Chute 3 groups and guides pile 4 of the grouped publications. A rotary transfer member is mounted between conveyor 1 and chute 3 and has a shaft 5 turning in fixed bearings 6. This member includes radial elements 7 formed as arms uniformly and angularly disposed in the same plane and fixed to shaft 5. Shaft 5 is rotated to transfer the publications by arms 7 from conveyor 1 and to group the publications in a pile 4 in chute 3.

Shaft 5 is rotated by pulley or gear 8 which is rotated by a belt or chain 9. Belt or chain 9 is driven by a crank including a pulley or gear 10 fixed on shaft 22 which in turn is eccentrically mounted on disc 20 which is centrally secured to shaft 11. Shaft 11 is mounted in fixed bearing 12. Suitable means, not shown, rotate shaft 11 in the direction of arrow 21. Pulley or gear 10 has an adjustable eccentricity with respect to shaft 11 so as to provide a continuous variation of the driven speed of belt or chain 9. This results in a uniformly accelerated and decelerated speed of rotation of shaft 5 for each rotation of shaft 11. The amplitude of the sinusoidal rate being a function of the eccentric position chosen for pulley or gear 10.

A takeup device including two idler pulleys or gears 13 and 16 compensates for the changes in effective length of belt or chain 9 due to the continuous variation of the distance between the axis of the eccentric pulley or gear 10 and the axis of shaft 5. Pulley or gear 13 rotates on a fixed shaft. An oscillating arm 14 is mounted on this fixed shaft. At the other extremity of arm 14 is shaft 15 on which pulley or gear 16 is rotatably mounted. A spring 17 is connected to shaft 15 to tension belt or chain 9.

The ratio of pulley or gear 8 to pulley or gear 10 is such that one rotation of pulley or gear 10 drives pulley or gear 8 in rotational displacement equivalent to the angular distance between two adjacent arms 7. In the embodiment of FIG. 2 this ratio is seen to 4 to 1 since arms 7 are spaced at 90°.

In the embodiment of the invention described above, the motor shaft 11 rotates plate 20 which rotates in the direction of arrow 21. Pulley 10 has a diameter equal to a quarter of the diameter of wheel 8. Pulley 10 is fixed on its shaft 22 and shaft 22 is fixed on plate 20 but the position of shaft 22 on plate 20 is regulatable by any suitable and known means. For example, plate 20 can have a radial groove extending to the center of the plate and shaft 22 can be locked by a screw in any desired position in this groove.

If shaft 22 is at the center of plate 20, pulley 10 rotates on the axis of shaft 11 and wheel 8 is driven at a constant speed. For each rotation of shaft 11, wheel 8 makes a quarter turn and each arm 7 moves to identical position with respect to conveyor 20.

If shaft 22 is eccentric with respect to shaft 11 as when secured in another position in the groove in the plate, wheel 8 always makes a quarter turn for each turn of shaft 11 but its angular speed is not constant. The speed of chain 9 is then a combination of its constant speed of movement of pulley 10 and of the variable component of the speed of shaft 12. This component on chain 9 is practically sinusoidal. It is therefore obvious that during a turn of shaft 11, and during the angular displacement of one step of an arm 7, the speed is increasing during a part of the cycle when shaft 22 moves away from wheel 8 then decreasing during the other part of the cycle. The amplitude of the sinusoidal speed adds to or subtracts from the constant base speed depending obviously on the eccentricity between shafts 11 and 22. It is easy to determine a value which will, if desired, produce an instantaneous stopping of the movement of each arm 7 during a cycle. Conveyor 1 and motor shaft 11 are synchronized so that each publication 2 is moved between two arms 7 at the moment when their speed of rotation is minimum or they may even be at rest.

It should now be obvious that the above-described embodiment provides more time for the introduction of the publication into the rotary transfer member due to deceleration or momentary stopping of the transfer mechanism at the appropriate time without increasing the total time of the operating cycle as compared to uniform rotation of the transfer mechanism.

I claim:

1. Apparatus for piling and grouping publications comprising a rotary transfer member, a shaft for said member, radial elements mounted on said shaft and at equal angles about said shaft, a conveyor moving the publications one at a time at predetermined intervals into the space between adjacent radial elements, a chute disposed adjacent to said rotary transfer member receiving publications from said rotary member, said chute grouping and guiding the publications and means for to rotating said rotary member and for uniformly decelerating the speed of rotation of said rotary member and thereafter uniformly accelerating the speed of rotation of said rotary member without increasing the total time cycle of the apparatus, said conveyor moving the publications into said space when the speed of said rotary member is at its minimum value.

2. Apparatus as described in claim 1, including a flexible nonextensible driving member rotating said transfer member, a crank having adjustable eccentricity driving said nonextensible flexible member and a takeup device applying uniform tension to said nonextensible flexible member.